US008903250B2

(12) United States Patent
Boyd et al.

(10) Patent No.: US 8,903,250 B2
(45) Date of Patent: Dec. 2, 2014

(54) COST-EFFECTIVE MULTI-RATE UPSTREAM FOR 10GEPON BASED ON HIGH EFFICIENCY CODING

(75) Inventors: Edward Wayne Boyd, Petaluma, CA (US); Ryan Edgar Hirth, Windsor, CA (US); Rick Weidong Li, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 231 days.

(21) Appl. No.: 13/150,802

(22) Filed: Jun. 1, 2011

(65) Prior Publication Data

US 2012/0045209 A1 Feb. 23, 2012

Related U.S. Application Data

(60) Provisional application No. 61/375,665, filed on Aug. 20, 2010.

(51) Int. Cl.
*H04J 14/00* (2006.01)
*H04B 10/00* (2013.01)
*H04B 10/04* (2006.01)
*H04B 10/12* (2006.01)
*H04B 10/272* (2013.01)

(52) U.S. Cl.
CPC ................... *H04B 10/272* (2013.01)
USPC ............. 398/168; 398/66; 398/153; 398/189; 398/190; 398/191

(58) Field of Classification Search
None
See application file for complete search history.

(56) References Cited

U.S. PATENT DOCUMENTS

| | | | | |
|---|---|---|---|---|
| 2001/0035997 | A1* | 11/2001 | Agazzi | 359/173 |
| 2006/0133809 | A1* | 6/2006 | Chow et al. | 398/66 |
| 2007/0058974 | A1* | 3/2007 | Krimmel | 398/63 |
| 2007/0122163 | A1* | 5/2007 | Dalton et al. | 398/208 |
| 2007/0127923 | A1 | 6/2007 | Dalton et al. | |
| 2009/0092394 | A1* | 4/2009 | Wei et al. | 398/79 |
| 2009/0162053 | A1* | 6/2009 | Ikeda et al. | 398/25 |
| 2010/0028002 | A1* | 2/2010 | Qian et al. | 398/79 |

FOREIGN PATENT DOCUMENTS

| | | |
|---|---|---|
| CN | 1889406 A | 1/2007 |
| CN | 101325467 A | 12/2008 |
| JP | 2004266804 A | 9/2004 |
| KR | 1020060067054 A | 6/2006 |

OTHER PUBLICATIONS

Banerjee et al., "Wavelength-division-multiplexed passive optical network (WDM-PON) technologies for broadband access: a review", Nov. 2005, Optical Society of America, vol. 4, No. 11, pp. 737-758.*

(Continued)

*Primary Examiner* — Darren E Wolf
(74) *Attorney, Agent, or Firm* — Sterne, Kessler, Goldstein & Fox PLLC (57) ABSTRACT

Systems and methods are disclosed to provide an upstream rate between 1 Gbps and 10 Gbps in a cost effective manner in a 10 GEPON. In an embodiment, an optical network unit (ONU) transmitter includes a burst transceiver and a physical layer (PHY) including a high performance digital to analog converter (DAC), a pulse amplitude modulation (PAM) module configured to encode end user data using a modulation scheme having more than two levels, and a laser. The ONU transmitter transmits the encoded end user data to an optical line terminal (OLT) receiver, which demodulates the data using a PAM demodulator and sends it to a service provider.

22 Claims, 6 Drawing Sheets

(56) References Cited

OTHER PUBLICATIONS

Office Action for related Chinese Patent Application No. 201110233169.8; 6 pages.
English-language abstract for Chinese Patent Application Publication No. 101325467 A; 1 page.
English-language abstract for Japanese Patent Application Publication No. 2004266804 A; 2 pages.
English-language abstract for Korean Patent Application Publication No. 1020060067054 A; 1 page.
Chinese Office Action directed towards related Chinese Application No. 201110233169.8 dated Sep. 30, 2014, from the State Intellectual Property Office of the P.R.C.; 7 pages.
English language abstract of CN 1889406 A, Thomson Innovation, http://www.thomsoninnovation.com, accessed Oct. 20, 2014, listed as document FP1 on the accompanying form PTO/SB/08A; 5 pages.

* cited by examiner

|  | Symbol rate | Nominal upstream rate | DS/US Ratio |
| --- | --- | --- | --- |
| PAM-4 | 1.25G | 2.5Gbps | 4:1 |
| PAM-4 | 2.5G | 5Gbps | 2:1 |
| PAM-8 | 1.25G | 3.75Gbps | 3:1 |
| PAM-8 | 2.5G | 7.5Gbps | 1.3:1 |
| PAM-16 | 1.25G | 5Gbps | 2:1 |
| PAM-16 | 2.5G | 10Gbps | 1:1 (symmetrical) |

COST-EFFECTIVE MULTI-RATE UPSTREAM FOR 10GEPON BASED ON HIGH EFFICIENCY CODING

CROSS REFERENCE TO RELATED APPLICATIONS

This application claims the benefit of U.S. Provisional Application No. 61/375,665, filed on Aug. 20, 2010, which is incorporated herein by reference in its entirety.

FIELD OF THE INVENTION

This invention relates to ethernet communications and more specifically to coding for ethernet communications.

BACKGROUND OF THE INVENTION

Previous passive optical network implementations include upstream and downstream data rate combinations that do not cost effectively fit the evolving and changing upstream and downstream bandwidth ratios demanded by changing end user applications.

What is needed are methods and systems for providing an upstream rate between 1 Gbps and 10 Gbps in a 10GEPON system in a cost effective manner.

BRIEF DESCRIPTION OF THE DRAWINGS/FIGURES

The accompanying drawings, which are incorporated in and constitute part of the specification, illustrate embodiments of the invention and, together with the general description given above and the detailed descriptions of embodiments given below, serve to explain the principles of the present invention. In the drawings.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

A passive optical network (PON) is a point-to-multipoint network architecture comprising an optical line terminal (OLT) at the service provider and optical network units (ONUs) at subscribers for providing the subscribers broadband services. The IEEE 802.3av 10GEPON (10 Gigabits per second Ethernet Passive Optical Network) standard specifies two data rates—an asymmetric 10/1 data rate [10 Gigabits per second (Gbps) downstream and 1 Gbps upstream] and a symmetric 10/10 data rate (10 Gbps downstream and 10 Gbps upstream).

The 10/1 and 10/10 data rate combinations in 10GEPON do not cost effectively fit the evolving and changing downstream and upstream bandwidth ratios demanded by changing end user applications, such as IPTV and YouTube. For example, the 10/10 data rate requires high cost optics (e.g., for ONUs), and the 10 Gbps upstream bandwidth may not be needed by the applications. On the other hand, while the 10/1 data rate is more cost effective than the 10/10 data rate, the 10/1 data rate does not have adequate upstream bandwidth to support upstream heavy services, such as personal publishing and upload, or future applications, especially for high split Fiber to the Home (FTTH) deployment, which is an increasing market segment.

Embodiments of the present invention provide an upstream rate between 1 Gbps and 10 Gbps in a cost effective manner by using existing 1 Gbps optics (for example, for ONUs and OLTs) and high efficiency coding schemes, thus lowering the cost per subscriber when compared to a 10/10 system. Advantageously, systems and methods in accordance with the present invention provide multiple upstream rates, including 2.5 Gbps, 5 Gbps, and 7.5 Gbps. Thus, embodiments of the present invention support changing and unpredictable downstream/upstream bandwidth ratios. Further, systems and methods in accordance with the present invention provide adequate bandwidth for high split FTTH deployment in the upstream.

2. Passive Optical Network Topology

Ethernet passive optical networks (EPONs) combine Ethernet technology with inexpensive passive optics. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Furthermore, EPONs are more suitable for Internet Protocol (IP) traffic, since Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers (see FIG. 1).

Figure 2:
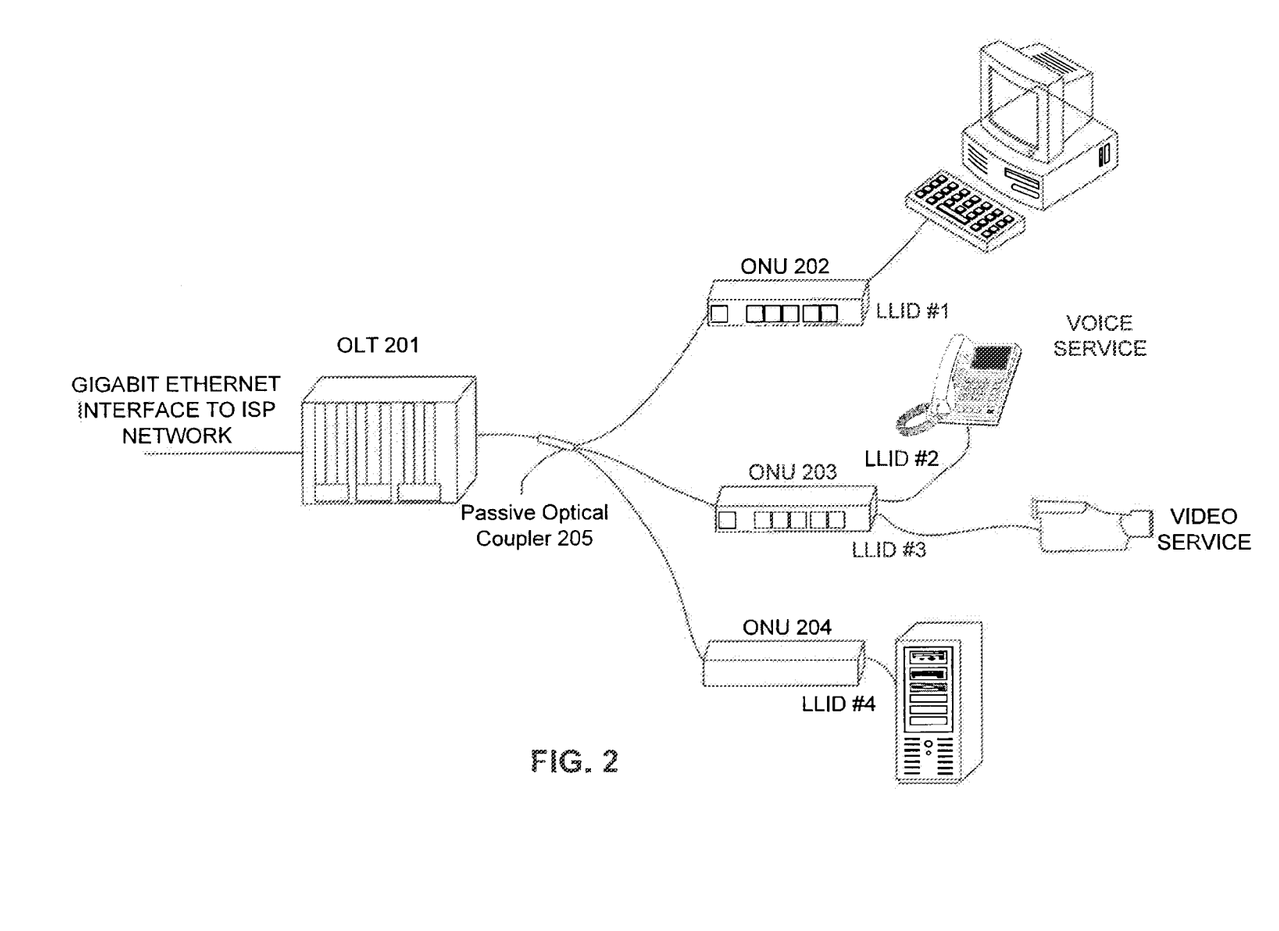
FIG. 2 illustrates a passive optical network including a single OLT and multiple ONUs.

Transmissions within an EPON are typically performed between an optical line terminal (OLT) and optical networks units (ONUs) (see FIG. 2). The OLT generally resides in a central office and couples the optical access network to the metro backbone, which is typically an external network belonging to an ISP or a local exchange carrier. The ONU can be located either at the curb or at an end-user location, and can provide broadband voice, data, and video services. ONUs are typically coupled to a one by N (1×N) passive optical coupler, where N is the number of ONUs, and the passive optical coupler is typically coupled to the OLT through a single optical link. This configuration can achieve significant savings in the number of fibers and amount of hardware required by EPONs.

Communications within an EPON can be divided into upstream traffic (from ONUs to OLT) and downstream traffic (from OLT to ONUs). In the upstream direction, the ONUs need to share channel capacity and resources, because there is only one link coupling the passive optical coupler with the OLT. In the downstream direction, because of the broadcast nature of the 1×N passive optical coupler, downstream data frames are broadcast by the OLT to all ONUs and are subsequently extracted by their destination ONUs based on their individual Logic Link Identifiers (LLIDs). An LLID carries physical address information for a frame and determines which ONU is allowed to extract the frame.

Figure 1:
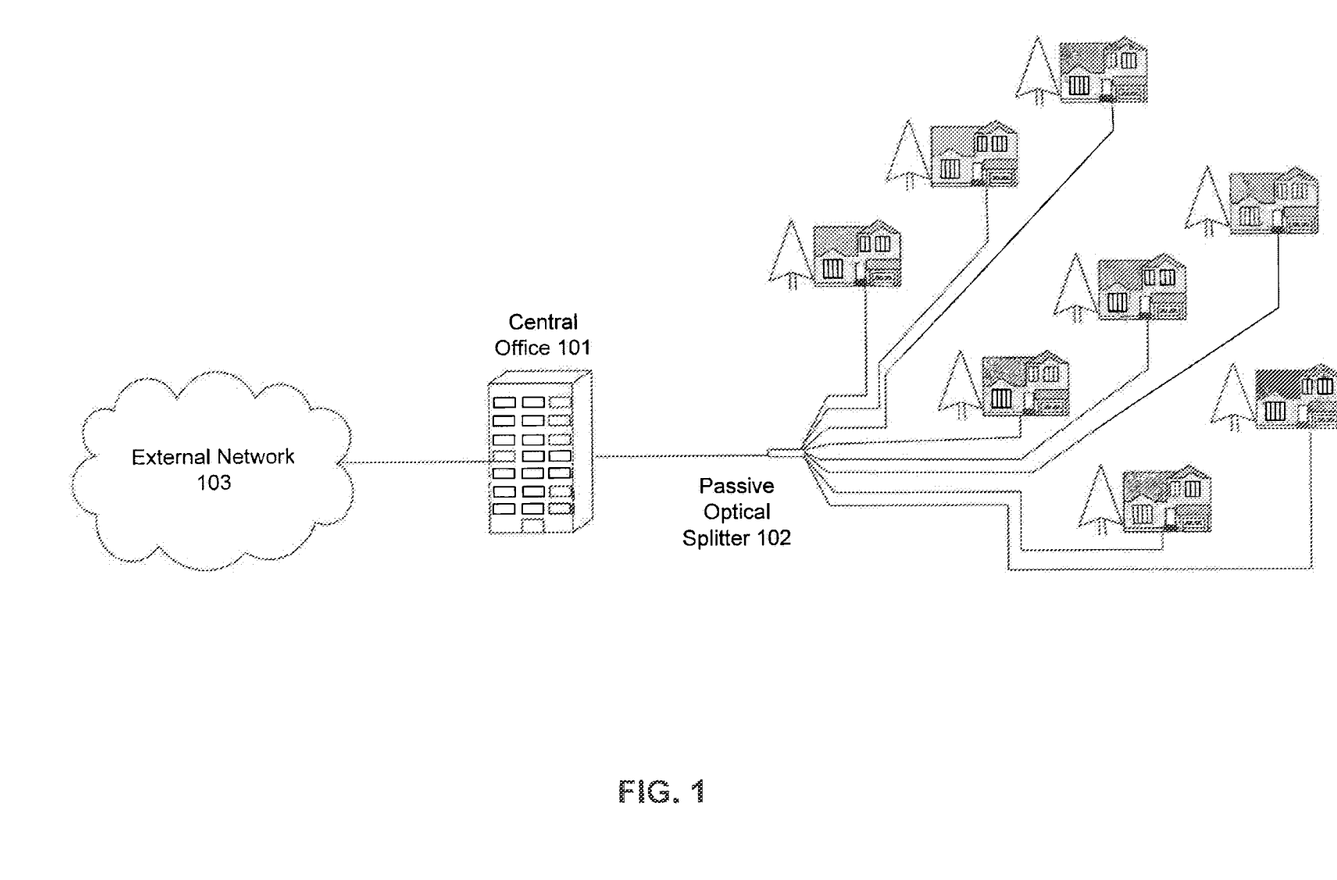
FIG. 1 illustrates a passive optical network wherein a central office and a number of subscribers are coupled together through optical fibers and a passive optical splitter.

FIG. 1 illustrates a passive optical network (PON), wherein a central office and a number of subscribers are coupled together through optical fibers and a passive optical splitter. As shown in FIG. 1, a number of subscribers are coupled to a central office 101 through optical fibers and a passive optical splitter 102. Passive optical splitter 102 can be placed in the vicinity of end-user locations, so that the initial fiber deployment cost is minimized. Central office 101 can be coupled to an external network 103, such as a metropolitan area network operated by an Internet service provider (ISP). Note that although FIG. 1 illustrates a tree topology, a PON can also be based on other topologies, such as a ring or a bus.

FIG. 2 illustrates a passive optical network including a single OLT and multiple ONUs. OLT 201 is coupled with ONUs 202, 203, and 204 through optical fibers and a passive optical coupler 205. As is illustrated in FIG. 2, an ONU can accommodate a number of networked devices, such as personal computers, telephones, video equipment, network servers, etc. One or more networked devices belonging to the same class of service are typically assigned a Logical Link ID (LLID), as defined in the IEEE 802.3 standard. An LLID establishes a logical link between an ONU and OLT, which accommodates specific service level agreement (SLA) requirements. In this example, LLID #1 is assigned to regular data services for ONU 202; LLID #2 is assigned to voice services for ONU 203; LLID #3 is assigned to video services for ONU 203; and LLID #4 is assigned to mission-critical data services for ONU 204.

3. 10GEPON Upstream Physical Layer (PHY) Embodiments

As discussed above, the 10/10 data rate requires high cost optics (e.g., for ONUs 202, 203, and 204 and OLT 201), and the 10 Gbps upstream bandwidth may not be needed by all end user applications. On the other hand, while the 10/1 data rate is more cost effective than the 10/10 data rate, the 10/1 data rate does not have adequate upstream bandwidth to support upstream heavy bandwidth services.

Embodiments of the present invention provide a new 10GEPON upstream physical layer (PHY) to allow the use of cost-efficient 1 Gbps optics while providing up to 10 Gbps data rates in the upstream direction. The PHY incorporates one or more hardware or software module(s) to enable different levels of coding to achieve different upstream data rates. In an embodiment, the PHY uses a more complicated coding scheme than conventional 10GEPON systems to achieve a faster upstream data rate. Embodiments of the present invention are especially useful in the upstream direction, as ONUs are typically given timeslots to transmit data upstream in burst mode (for example, using time division multiple access (TDMA) to allocate time slots to ONUs). However, while the PHY is typically used for the upstream direction, it is also contemplated that embodiments of the present invention could be implemented in the downstream direction as well. Advantageously, a PHY in accordance with embodiments of the present invention may be implemented without changing the upper layer MAC protocol, management, and application layers.

Conventional encoding schemes use Non-return-to-zero (NRZ) encoding. NRZ encoding is a binary coding technique conveying only a single bit per transmitted symbol (and thus only two levels are present). By incorporating multiple amplitude levels into a coding scheme, more data bits are used per symbol and therefore more cost-efficient optics may be used.

In an embodiment, pulse amplitude modulation (PAM) is used to encode information in the amplitude of a series of signal pulses. Systems and methods in accordance with the present invention utilize different levels of PAM modulation to provide multiple upstream rates, including 2.5 Gbps, 5 Gbps, 7.5 Gbps, and 10 Gbps, using existing cost-effective 1 Gbps optics and high efficiency coding schemes.

For example, a two bit modulator (PAM-4) includes four possible signal amplitude levels (one for each combination of two bits). Thus, in a PAM-4 modulation scheme, the amplitude of a signal may be mapped to one of four possible levels using two bits. A three bit modulator (PAM-8) includes eight possible levels, (one for each combination of three bits). Thus, in a PAM-8 modulation scheme, the amplitude of a signal may be mapped to one of eight possible levels using three bits. By using increasing orders of modulation, upstream rates of up to 10 Gbps are possible, depending on the symbol rate (the rate at which symbols (pulses) are sent). The bit rate is equivalent to the symbol rate times the number of bits conveyed per second. Thus, a 1.25 G symbol rate (1.25 G pulses sent per second) using a PAM-4 modulation scheme (conveying two bits per second) will result in a bit rate of 2.5 Gbps upstream rate. Likewise, a 2.5 G symbol rate (2.5 G pulses sent per second) using a PAM-16 modulation scheme (conveying 4 bits per second) will result in a bit rate of 10 Gbps.

Figure 3:
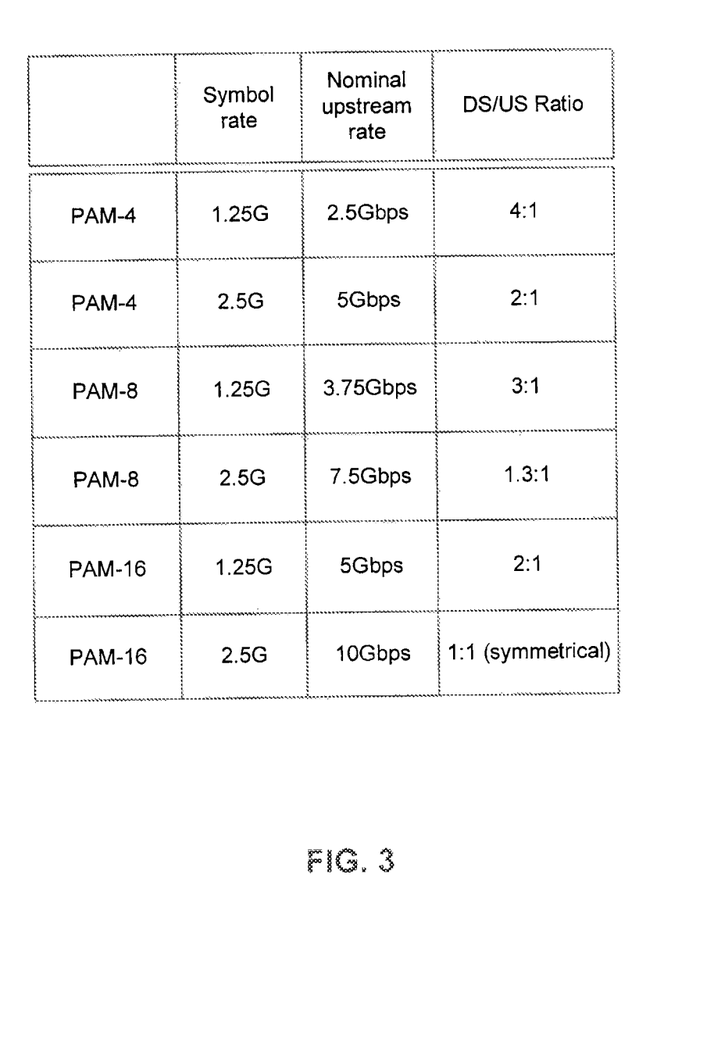
FIG. 3 depicts a table of PAM modulation schemes and corresponding symbol rates and the resulting upstream rates and upstream/downstream ratios that are achievable.

FIG. 3 depicts a table of PAM modulation schemes and corresponding symbol rates and the resulting upstream rates and upstream/downstream ratios that are achievable. Embodiments of the present invention advantageously provide different orders of modulation schemes, allowing for different corresponding upstream rates and upstream/downstream ratios. Optimal upstream/downstream ratios may depend (and change) with end user application characteristics.

Accordingly, using a scheme incorporating an increasing order of modulation, more bits are conveyed per symbol in comparison to a conventional NRZ coding scheme, which only conveys one bit per symbol. Conveying more bits per symbol enables the PHY to transmit more slowly while conveying the same information, which allows for the use of cheaper optics (for example, a laser in an ONU). While PAM modulation schemes are discussed above, it is noted (and contemplated) that any higher order modulation schemes may be used in embodiments of the present invention to transmit multiple bits per second and thus to support a higher upstream rate using cheaper optics. For example, modulation schemes, modules, modulators, and demodulators using pulse width modulation (PWM), frequency modulation (FM), and sub-carrier modulation (SCM) are also contemplated.

Embodiments of the present invention provide a flexible transport solution that satisfies a range of ratios at a range of cost points. Further, modulation systems incorporating higher levels may lead to a higher signal to noise ratio (SNR) or increased power loss. Incorporating a PHY into EPON optics that supports different orders of modulation, in accordance with embodiments of the present invention, advantageously allows for a range of ratios to be selected from and used to balance the effects of cost, bandwidth, noise, and power to provide an optimal transport solution based on changing circumstances.

3.1 OLT Receiver PHY Embodiment

Figure 4:
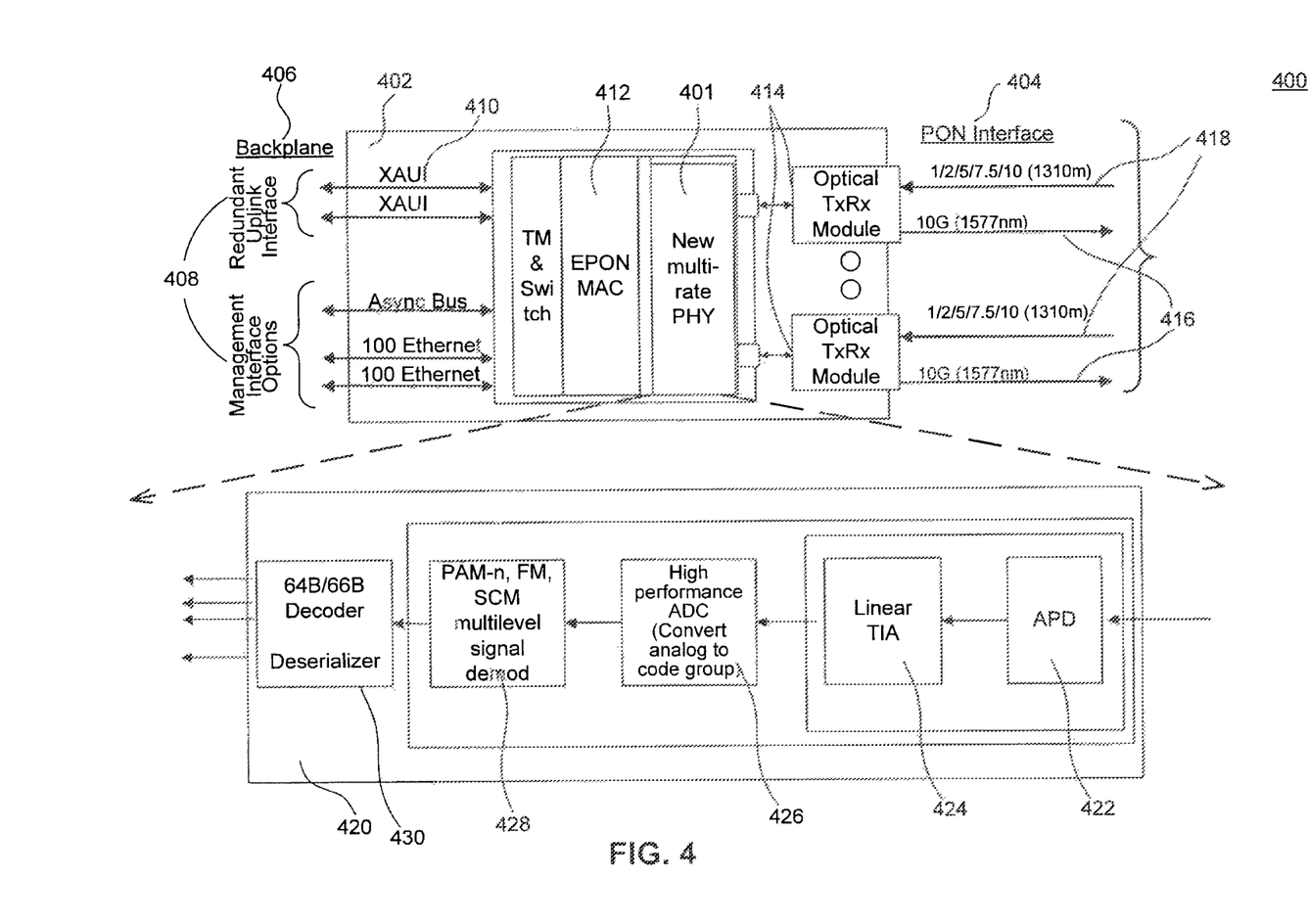
FIG. 4 is a block diagram of an OLT receiver in accordance with an embodiment of the present invention.

FIG. 4 is a block diagram 400 of an OLT receiver 402 in OLT 201 in accordance with an embodiment of the present invention. A multi-rate PHY 401 that supports multiple levels of coding is incorporated into OLT receiver 402. OLT receiver 402 is coupled to a passive optical network (PON) interface 404 and a backplane 406 that interfaces 408 with a service provider. In an embodiment, a 10 Gigabit Media Independent. Interface (XGMII) extender according to the XAUI standard 410 may be implemented to extend the XGMII between the Media Access Control layer (MAC) 412 and PHY 401. PHY 401 is coupled to a plurality of optical transmit/receive modules 414 in communication with ONUs 202, 203, and 204. As discussed above, OLT receiver 201 is configured to have a 10 Gbps downstream rate 416 for transmission to the ONUs 202, 203, and 204. Further, as discussed above, the upstream rate may be configured using higher order coding rates 418 (for example, 1 Gbps, 2 Gbps, 5 Gbps, 7.5 Gbps, and 10 Gbps) in accordance with embodiments of the present invention.

FIG. 4 also depicts a more detailed diagram 420 of PHY 401 in accordance with an embodiment of the present invention. In an embodiment, PHY 401 receives downstream information via an avalanche photodiode (APD) 422 coupled to a linear transimpedance amplifier (TIA) 424. The downstream information is converted to a digital format using an analog to digital converter (ADC) 426 and is input into a multilevel signal demodulator 428 in accordance with embodiments of the present invention to demodulate the downstream information sent to ONUs 202, 203, and 204. Multilevel signal demodulator 428 provides multilevel PAM demodulation depending on which PAM modulation level is chosen at the ONU. The demodulated signal is then decoded and deserialized 430 before being sent to the service provider.

3.2 ONU Transmitter PHY Embodiment

Figure 5:
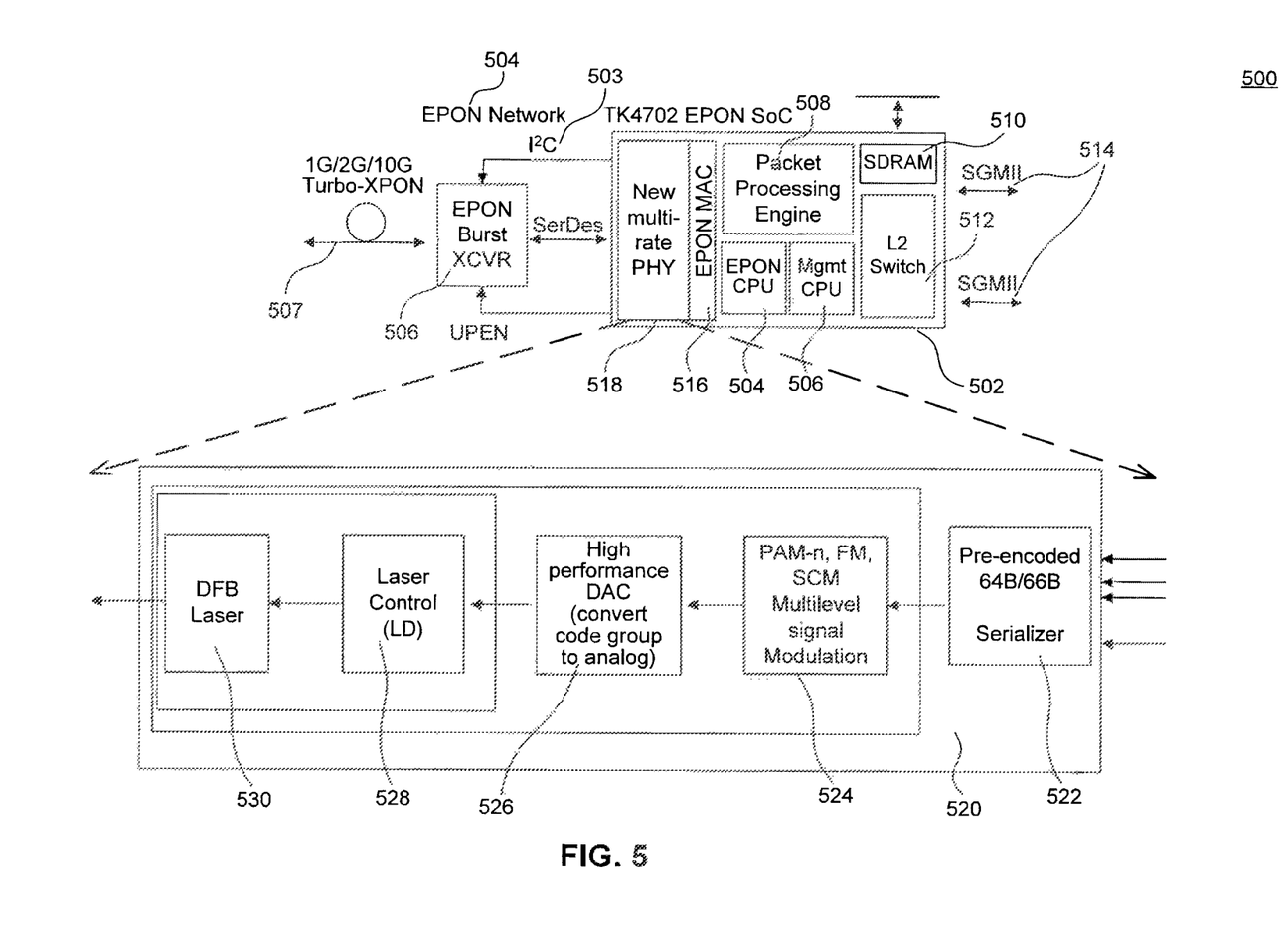
FIG. 5 is a block diagram of an ONU transmitter in accordance with an embodiment of the present invention.

FIG. 5 is a block diagram 500 of an ONU transmitter in accordance with an embodiment of the present invention. The ONU transmitter is implemented in ONUs 202, 203, and 204. FIG. 5 shows an EPON system on a chip (SoC) 502 coupled to an EPON network 504. The SoC 502 is coupled to an EPON burst transceiver 506 for communication 507 with the EPON network 504 via an inter-integrated circuit ($I^2C$) bus 503. In an embodiment, the SoC 502 includes an EPON CPU 504, a management CPU 506, a packet processing engine 508, memory (synchronous dynamic random access memory (SDRAM)) 510, and a switch 512. In an embodiment, a Serial Gigabit Media Independent Interface (SGMII) 514 is used to connect the EPON media access control (MAC) layer 516 to a multi-rate PHY 518, which supports multiple levels of coding in accordance with embodiments of the present invention.

FIG. 5 also depicts a more detailed diagram 520 of PHY 518 in accordance with an embodiment of the present invention. In an embodiment, serializer 522 receives parallel data to provide serialized data to modulator 524. Modulator 524 then modulates the serial data from the serializer 522 using a multilevel modulation scheme (e.g. PAM-n) in accordance with embodiments of the present invention, which is then converted into an analog format using a digital to analog converter (DAC) 526. The analog data is then transmitted using a laser. Advantageously, a cheaper laser may be used to send the data due to the multilevel modulation scheme implemented in accordance with embodiments of the present invention, as the multilevel modulation scheme provides multiple bits per symbol. In an embodiment, the data is sent to a laser control module [for example, a laser diode (LD) controller 528] and then passed to a distributed feedback (DFB) laser 530 before being sent to the EPON burst transceiver 506.

Optionally, embodiments of the present invention may also incorporate additional high coding gain forward error correction (for example, using a FEC module) to provide additional optical power budget to support high split (1:128 or even 1:256) Fiber to the Home (FTTH) deployment, which is an increasing market segment. Further, in an embodiment, a training sequence is added to the start of the burst for calibration of the level thresholds used for the multilevel modulation scheme being employed.

4. Methods

A method 600 in accordance with an embodiment of the present invention will now be described with reference to FIG. 6. In step 602, end user data is encoded using a PAM scheme having more than two levels. This data may then be converted into analog format. In an embodiment, the end user data is encoded at an ONU. In step 604, the encoded end user data is transmitted to an OLT receiver. In an embodiment, the encoded end user data is transmitted as a signal including a predetermined number of bits per symbol, determined based on an order of the modulation scheme. In an embodiment, the OLT receiver converts the encoded end user data into a digital format. Step 606 is optional. In step 606, the encoded end user data is demodulated based on the modulation scheme determined by the ONU.

Figure 6:
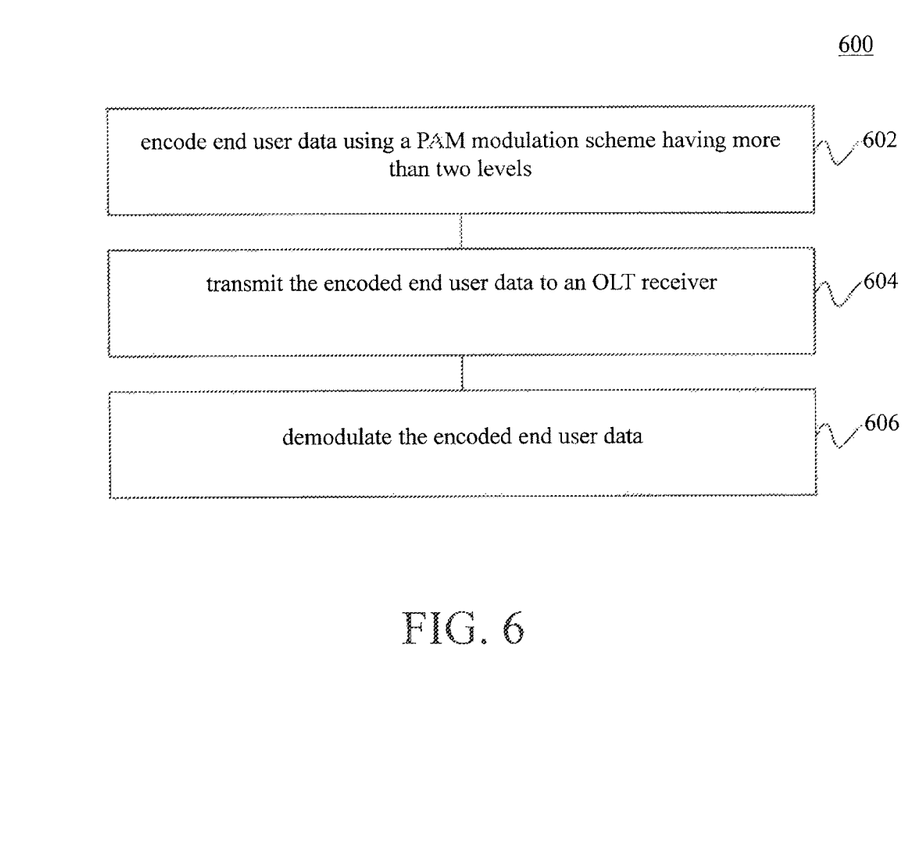
FIG. 6 is a flow chart of a method in accordance with an embodiment of the present invention.

While FIG. 6 describes one method in accordance with an embodiment of the present invention, it should be noted that additional methods according to any of the disclosed embodiments of the present invention (e.g., methods in accordance with the systems and apparatuses discussed in sections 1-3.2 above) are also contemplated.

5. Conclusion

The above systems and methods may be implemented as a computer program executing on a machine, as a computer program product, or as a tangible and/or non-transitory computer-readable medium having stored instructions.

For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present invention.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system comprising an optical network unit (ONU) transmitter, wherein the ONU transmitter includes:
   a pulse amplitude modulation (PAM) module configured to:
      receive end user data corresponding to an end user application,
      select, from a plurality of orders of a modulation scheme, an order of the modulation scheme based on a characteristic of the end user application, and
      encode the end user data using the modulation scheme with the selected order;
   a digital to analog converter (DAC) coupled to an output of the PAM module; and
   an optical transmission device coupled to an output of the DAC, wherein the optical transmission device is configured to transmit the encoded end user data.

2. The system of claim 1, further comprising:
   an optical line terminal (OLT) receiver configured to receive the encoded end user data, wherein the OLT receiver includes:
      an analog to digital converter (ADC), and
      a demodulator coupled to an output of the ADC.

3. The system of claim 2, further comprising:
   a passive optical network (PON) interface coupled to the OLT receiver; and
   a backplane coupled to the OLT receiver, wherein the backplane is configured to interface with a service provider.

4. The system of claim 2, wherein the OLT receiver includes a physical layer (PHY) coupled to a plurality of optical transmit/receive modules, and wherein the optical transmit/receive modules are in communication with a plurality of optical network units (ONUs).

5. The system of claim 4, wherein the PAM module is configured to support the following data transmission rates depending on the order of the modulation scheme:
   1 Gpbs;
   2 Gbps;
   5 Gbps;
   7.5 Gbps; and
   10 Gbps.

6. The system of claim 1, wherein the optical transmission device is a laser.

7. The system of claim 1, further comprising:
   a training sequence module configured to add a training sequence to the start of a burst for calibration of level thresholds used for the modulation scheme.

8. The system of claim 1, wherein the order of the modulation scheme determines a rate of transmission of the ONU transmitter.

9. The system of claim 8, wherein the optical transmission device is configured to convey a predetermined number of bits per symbol, and wherein the predetermined number of bits per symbol is determined based on the order of the modulation scheme.

10. A system comprising an optical line terminal (OLT), wherein the OLT includes:
    a transceiver configured to receive end user data corresponding to an end user application in communication with a plurality of optical network units (ONUs); and
    a physical layer (PHY) coupled to the transceiver, wherein the PHY includes:
       an analog to digital converter (ADC), and
       a demodulator configured to demodulate the end user data according to a modulation scheme set by the ONUs, wherein an order of the modulation scheme is selected from a plurality of orders by the ONUs based on a characteristic of the end user application.

11. The system of claim 10, wherein the demodulator is one of:
    a pulse amplitude modulation (PAM) demodulator;
    a pulse width modulation (PWM) demodulator;
    a frequency modulation demodulator; or
    a sub-carrier modulation demodulator.

12. The system of claim 10, further comprising an optical network unit (ONU), wherein the ONU includes:
    a second PHY including:
       a modulation module configured to encode the end user data using a modulation scheme having more than two levels, and
       an optical transmission device configured to transmit the encoded end user data to the OLT.

13. The system of claim 12, wherein the modulation module is one of:
    a pulse amplitude modulation (PAM) module;
    a pulse width modulation (PWM) module;
    a frequency modulation module; or
    a sub-carrier modulation module.

14. A method comprising:
    receiving, at an optical network unit (ONU), end user data corresponding to an end user application;
    selecting, at the ONU, an order of a modulation scheme from a plurality of orders based on a characteristic of the end user application;
    encoding the end user data using the modulation scheme with the selected order;
    converting the end user data to an analog format; and
    transmitting the encoded end user data to an optical line terminal (OLT) receiver.

15. The method of claim 14, further comprising:
    converting the encoded end user data to a digital format; and
    demodulating the encoded end user data based on the modulation scheme, 16. The method of claim 14, wherein the encoded end user data is transmitted as a signal including a predetermined number of bits per symbol, and wherein the predetermined number of bits per symbol is determined based on the order of the modulation scheme.

17. The system of claim 1, wherein the selection of the order is further based on hardware capabilities of the ONU and a desired data rate for upstream transmission.

18. A transmitter for an optical network unit (ONU), the transmitter comprising:
    a pulse amplitude modulation (PAM) module configured to:
       receive end user data corresponding to an end user application,
       select, from a plurality of orders of a modulation scheme, an order of the modulation scheme based on a characteristic of the end user application,
       select, based on the characteristic of the end user application, a symbol rate for the modulation scheme, and encode the end user data using the modulation scheme with the selected order and the selected symbol rate;
a digital to analog converter (DAC) coupled to an output of the PAM module; and
an optical transmission device coupled to an output of the DAC, wherein the optical transmission device is configured to transmit the encoded end user data.

19. The transmitter of claim 18, wherein the PAM module is configured to select the order and the symbol rate based on a desired data rate for upstream transmission and hardware capabilities of the ONU.

20. The transmitter of claim 18, wherein the PAM module is further configured to:
determine, based on the end user data, current upstream and downstream bandwidth requirements of the end user application; and
select the order and the symbol rate based on the current upstream and downstream bandwidth requirements of the end user application.

21. The transmitter of claim 18, wherein the PAM module is further configured to:
receive second end user data corresponding to the end user application;
determine, based on the second end user data, current upstream and downstream bandwidth requirements of the end user application;
select a second order and a second symbol rate based on the current upstream and downstream bandwidth requirements of the end user application, wherein the second order and the second symbol rate are different then the order and the symbol rate; and
encode the second end user data using the modulation scheme with the second order and the second symbol rate.

22. The transmitter of claim 18, wherein the PAM module is farther configured to:
determine, based on the end user data, an upstream to downstream bandwidth ratio required by the end user application; and
select the order and the symbol rate based on the upstream to downstream bandwidth ratio.

* * * * *